UNITED STATES PATENT OFFICE.

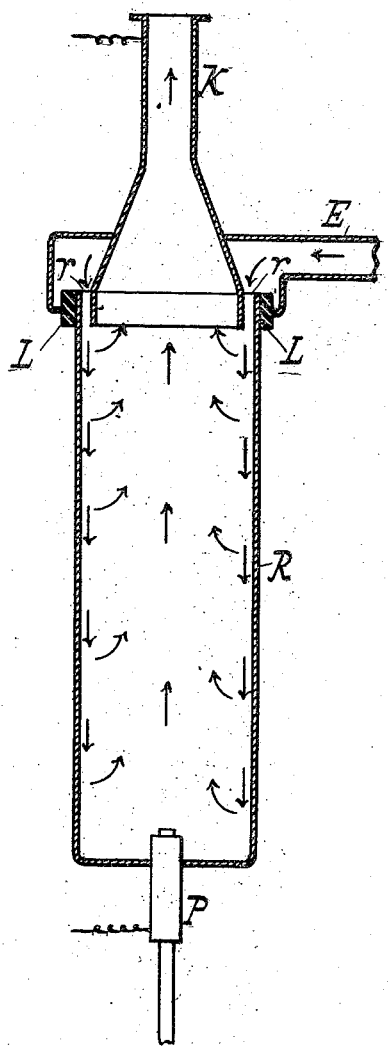
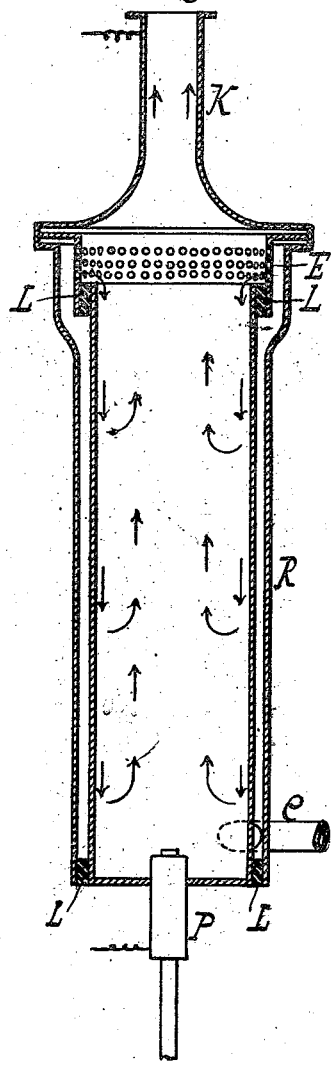

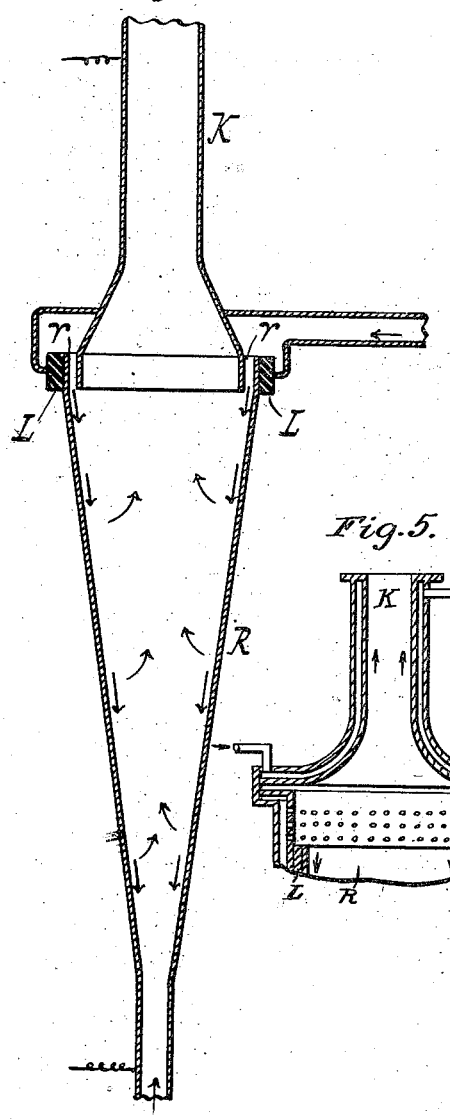
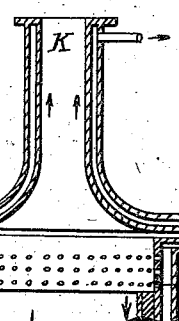
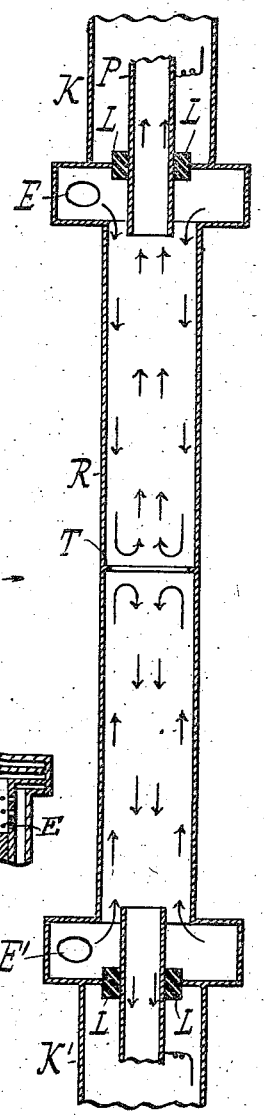

OTTO SCHÖNHERR, OF DRESDEN-STRIESEN, GERMANY, AND JOHANNES HESSBERGER, OF CHRISTIANSAND, NORWAY, ASSIGNORS TO NORSK HYDRO-ELEKTRISK KVAEL-STOFAKTIESELSKAB, OF CHRISTIANIA, NORWAY, A CORPORATION OF NORWAY.

PROCESS AND APPARATUS FOR THE PRODUCTION OF LONG CONTINUOUS ELECTRIC ARCS.

1,095,425. Specification of Letters Patent. Patented May 5, 1914.

Original application filed May 18, 1910, Serial No. 562,097. Divided and this application filed October 17, 1912. Serial No. 726,368.

*To all whom it may concern:*

Be it known that we, OTTO SCHÖNHERR and JOHANNES HESSBERGER, subjects of the King of Saxony and the King of Prussia, respectively, residing, respectively, at Dresden-Striesen, Germany, and Christiansand, Norway, have invented new and useful Improvements in Processes and Apparatus for the Production of Long Continuous Electric Arcs, of which the following is a specification.

The subject of this application was originally filed May 18th 1910, Serial No. 562,097, the present specification and claims being a division of the same pursuant to the requirement of the Patent Office.

In the specification of Letters Patent No. 930238 we have described the production of long stable electric arcs by causing an arc to spring from an insulated electrode connected with one pole of a source of electricity and situated at, or toward, one end of a long tube, or passage, the tube, or passage, itself being either connected with the other pole of the source of electricity, or containing at, or toward, the other end thereof, a second electrode connected with the other pole of the source of electricity, while at the same time a current of air, or other gas, or gases, is passed through the tube, or passage, with such velocity that a long and steadily burning electric arc is produced and maintained within the said tube, or passage. The said specification discloses, for the first time, a new principle, namely surrounding a long electric arc with a layer of non-conducting fluid and maintaining this layer of fluid in such a condition that it is easier for the arc to continue in the position in which it is burning than for it to spring through the layer of surrounding fluid. In order to bring about this condition, it is necessary that the layer of gas, (which we will hereinafter, for brevity, refer to as air, although other gas, under which term we include a gaseous mixture, may be used in carrying out this invention) should not be allowed to become so hot that it is capable of conducting electricity, or at all events that it should not reach this high temperature until it arrives at a point in the tube, or passage (which we will hereinafter, for brevity, refer to as the tube), where it is desired that the arc should pass through the layer to the second electrode or its equivalent. A particular method of carrying out the principle set forth consists, as described in the aforesaid specification, in passing a current of air in one direction through the tube, in which the arc is produced, commencing at a point either below, or at a short distance above, the insulated electrode. It is also preferable, according to the said specification, that the air should be passed into the tube with a tangential, or rotary, motion.

The specification of Letters Patent No. 976,002 describes the production of stable electric arcs by means of two tubes, each provided with an insulated electrode and leading into a common space. Air is blown past each electrode into the respective tube and is led away from the common space, while the arcs produced may join in the common space and form one continuous arc.

In Figure 3 of the drawings accompanying the last-named specification the two tubes are shown parallel to one another, but the specification does not restrict the arrangement to this particular position, as the two tubes may be placed end on to one another so that one straight continuous arc is obtained between two insulated electrodes, air being blown past each electrode and being withdrawn from the tube at, or near, the mid part thereof. We have discovered that instead of the air passing through the tube as described in the said specification, the arc can also be produced and maintained with certain advantages if the air be made to pass through the tube or through different portions of the tube in different directions lengthwise of the tube at one and the same time as hereinafter explained. For instance the air can be passed along the wall inside the tube in one direction and then back again in the reverse direction immediately surrounding the arc, so that it passes through the said tube or through different portions thereof, side by side, in different directions lengthwise of the said tube at one and the same time, or the air can be caused to pass in two opposite directions along different portions of the arc, preferably being withdrawn through each electrode, or through the parts of the apparatus which act as electrodes, or these variations can be combined so that air is introduced into the tube at each of the two ends thereof and passes along the interior wall toward the mid part and then reverses its course so as to pass back along the arc toward each of the two ends of the tube again.

When carrying out this invention we prefer to impart to the air, or to part of the air, entering the tube a tangential, or rotatory, motion, for instance such as is described in the aforesaid specification of Letters Patent No. 930,238, and it is also generally advisable to cool the openings through which the hot gases are removed from the tube. The tubes which can be used in carrying out this invention may be variously shaped, for instance the tube containing the arc can be a long cylinder. This latter shape is more particularly useful when the gases are taken away from each end of the tube.

We prefer generally to surround the tube containing the electric arc with a second tube and to pass the air through the space between the two tubes before allowing it to enter the inner tube, so that in this way the temperature of the inner tube is lowered and the air becomes preheated before entering the inner tube and consequently a higher temperature of the arc is admissible within the inner tube than would be the case if no such preheating took place. When, according to this invention, the air passes along the interior wall of the tube and then back again immediately surrounding the arc, a further advantage is attained, because heat is able to pass directly from the air immediately surrounding the arc to that which is moving in the opposite direction along the interior wall of the tube, and the transference of heat is greater because there is no intermediate wall through which the heat has to pass and since the hottest air does not come into contact with the wall of the tube a much higher temperature of the arc can be employed within the tube than would be the case if the temperature of the arc has to be restricted to prevent the material of which the tube is made from being injured. When the air is led into the tube at one end only and the gases are removed at the same end, the tube can be cone-shaped the entrance and exit being at the larger end of the cone.

If desired, instead of introducing the whole supply of air into the tube in the manner hereinbefore described, it can be introduced partly in such manner and partly in any other suitable way, for instance as described in the specification of the aforesaid Letters Patent No. 930,238.

The electrodes employed in carrying out the process according to this invention can be of various shapes. For instance they can be rod-shaped, as described in the aforesaid specification of Letters Patent No. 930,238, or they can be formed like a ring, and the end of the arc can continually move around the ring.

We give the following ways as examples of how this invention can be performed in practice, referring to the accompanying drawings, but the invention is not limited to these examples.

In the drawings, each of the Figs. 1 to 5 inclusive represents vertical sections of apparatus suitable for use according to this invention, showing how the electric arc can be produced and how the gas is caused to pass in the desired direction or directions.

In the arrangement shown in Fig. 1, two tubes are employed, namely an upper one K, of inverted funnel shape, partly entering a lower tube R so that there is a small ring-shaped opening r between them and through this opening the air is passed with a suitable velocity into the lower tube R, the said air passing down the interior of the wall thereof toward the electrode P which is situated at the lower end of the said tube R, and then taking a course in the opposite direction, as indicated by the arrows, and passing away through the upper tube K. When an electric arc is formed between the electrode P and the upper tube K, or a special electrode situated in the said tube K (for instance by momentarily short circuiting these two parts), the arc produced burns quietly in the lower tube R starting from the electrode P and ending either on the upper tube K, or on the special electrode situated in the said tube K. We prefer to introduce the air into the lower tube R so that the said air has a tangential, or rotatory, motion, and for this purpose an apparatus such as that illustrated in Fig. 2 can be employed. In this figure, E is a metal ring situated in the upper part of the lower tube R, the said ring E having tangential openings in it so that the air passes into the tube R with a rotatory motion, and for the greater part downward along the interior wall of the tube R toward the electrode P, then takes an upward course nearer the axis of the tube R, and finally the gases pass away through the upper tube K. As shown in the figure, the said electrode P and the lower tube R may be electrically connected together and be insulated from the other parts of the apparatus. The electric arc can be started by short-circuiting the upper and lower tubes R and K, the one end of the arc being driven down by the air current and terminating on the said electrode P, which is preferably cooled, for instance by means of water. As shown in this figure, the lower tube R can be surrounded by a second tube and the air can be passed, through the pipe e, upward between these two tubes before entering the inner tube R through the aforesaid tangentially perforated ring R. The other end of the arc can be situated on the upper tube K, either adjacent to the lower tube E, or at some distance above it. If desired, a special electrode can be provided in the upper tube K, in which case the arc burns between this electrode and the electrode P. Instead of all the air passing through the aforesaid ring E down the lower tube, some of it may be passed up the upper tube K without entering the lower tube R, and the proportion of air which follows this course will depend upon the relative sizes of the said tubes K and R. This is the case with the arrangement Fig. 2. The portion of the air passing directly through the upper tube K mixes with the heated gases leaving the lower tube R and tends to cool them down quickly, and this is of advantage when the electric arcs are used for carrying out endothermic reaction in gases, for instance for the production of nitric oxid. Of course the gases can be further subjected to a cooling process by using special means for cooling the upper tube K, for instance it can be surrounded by a water jacket as indicated in Fig. 5 after the manner of a Liebig's condenser.

Fig. 3 illustrates the use of a cone-shaped lower tube R which is insulated from the rest of the apparatus, the air passing in through the opening r between the tubes K and R into the lower tube, down the interior inclined wall thereof and then upward surrounding the axis. If desired, air can also be introduced at the lower end of the said lower tube R as illustrated by the arrow. When such an apparatus is used there is a tendency for the end of the arc to describe a circular path around the inner wall of the cone-shaped tube R.

Fig. 4 illustrates an arrangement in which air is introduced at each of the two ends of the tube R, passing along the inner wall thereof, then reversing its course so as to pass back along the arc, the gases finally leaving the tube through the two insulated electrodes P, P¹, and passing out by the passages K, K¹. The electrodes may, if desired, be cooled by means of water-jackets. A ring T may, if desired, be situated, as shown, in the tube R to assist in directing the course of the air which enters at any convenient number of openings (indicated at E E¹) with sufficient velocity to follow the courses indicated by the arrows. The arc can be formed by causing a short-circuit, either between the two electrodes, or between each electrode and the tube R. If desired, however, one of the electrodes may be electrically connected to the tube R, while the other electrode is insulated therefrom, in which case the arc can be started by short-circuiting this second electrode with the tube R.

In all the figures L represents insulating material.

What we claim is:

1. In producing long stable electric arcs by forcing a current of gas alongside of the body of the discharge causing the gas to pass at different portions of the arc side by side in reverse directions lengthwise of the said arc at one and the same time.

2. In producing long stable electric arcs by forcing a current of gas alongside of the body of the discharge causing the gas to pass at different portions of the arc side by side in reverse directions lengthwise of the said arc at one and the same time and causing the gas to leave the discharge space at the end of the arc and centrally with reference to said arc the gas being subjected to the cooling on its passing out of contact with the arc.

3. An apparatus of the kind described comprising a tube connected with a source of electricity, connections to lead to a blast generator and means for causing gas to enter at one end of the said tube to travel alongside of the arc produced and reverse its course leaving the tube at or near the end at which the said gases entered.

4. An apparatus of the kind described comprising a tube surrounded by and insulated from a second tube and connected with a source of electricity, connections to lead to a blast generator and means for causing gas to enter the space between the two said tubes and then to pass from the said space into one end of the said inner tube to travel along the tube and to reverse its course leaving at or near the end at which the said gas entered the said inner tube.

In testimony whereof we have hereunto set our hands in the presence of two subscribing witnesses.

OTTO SCHÖNHERR.
JOHANNES HESSBERGER.

Witnesses to the signature of Otto Schönherr:
PAUL ARRAS.
ARTHUR GUBE.

Witnesses as to the signature of Joh. Hessberger:
T. VESTBY.
P. BIRKELAND.